UNITED STATES PATENT OFFICE.

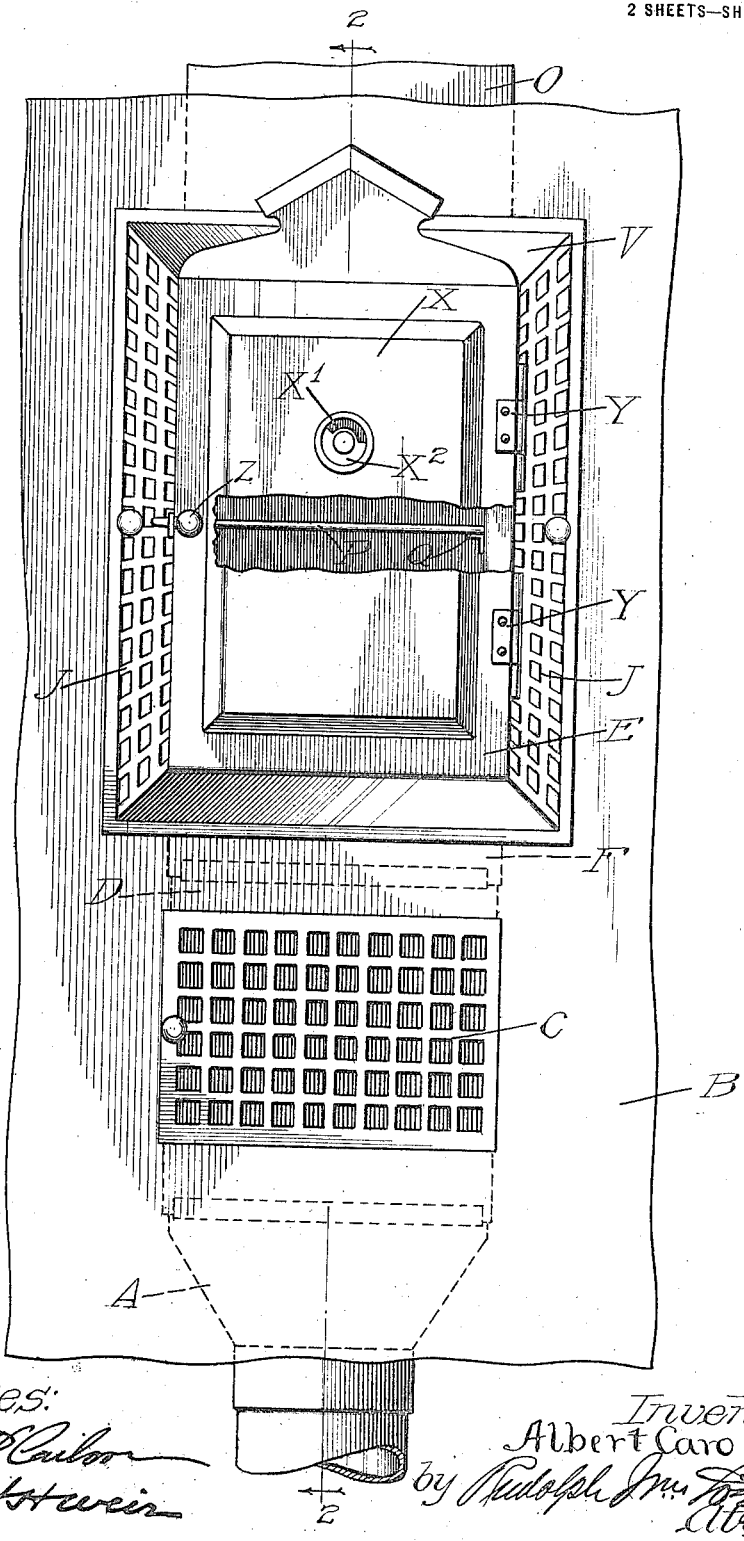

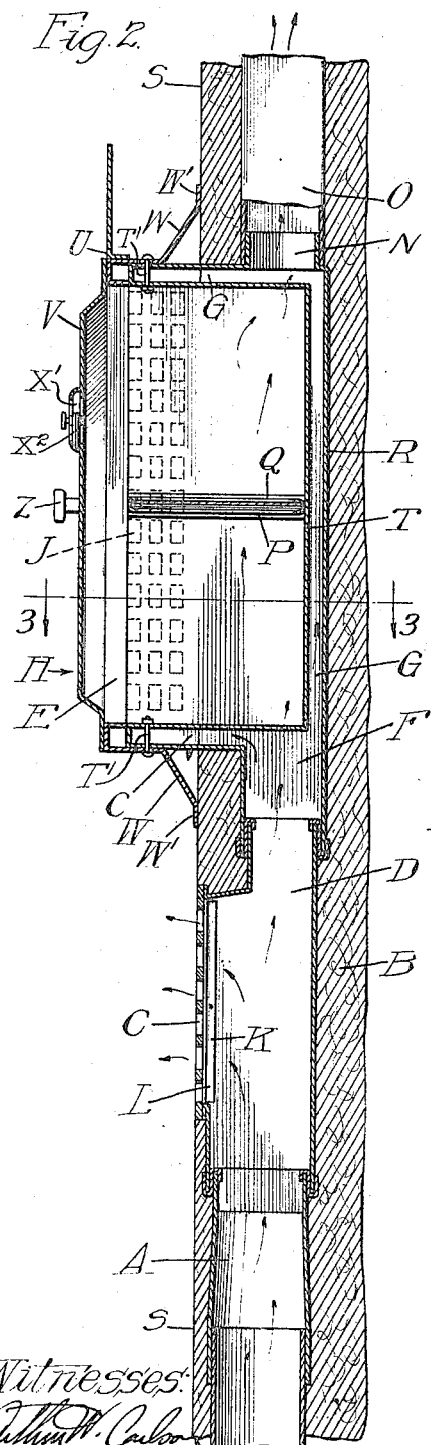

ALBERT CARO, OF MAYWOOD, ILLINOIS.

WARMING-OVEN.

1,238,743. Specification of Letters Patent. Patented Sept. 4, 1917.

Application filed February 12, 1916. Serial No. 78,032.

*To all whom it may concern:*

Be it known that I, ALBERT CARO, citizen of the United States, residing at Maywood, in the county of Cook and State of Illinois, have invented certain new and useful Improvements in Warming-Ovens; and I do hereby declare the following to be a full, clear, and exact description of the invention, such as will enable others skilled in the art to which it appertains to make and use the same.

My invention relates to improvements in warming devices and has particular reference to an improved hot air warming oven, or heating cabinet.

The object of my invention is to provide a warming oven of simple construction for use in conjunction with the usual hot air pipes of a hot air furnace; which shall be capable of being mounted within the wall of the room where it is installed; which shall efficiently make use of the rising hot air and which shall be ornamental in appearance adding to rather than detracting from the appearance of the room. A further object of my invention is to provide a warming oven of the kind described which shall also serve as a hot air register for the room in which it is placed, emitting the hot air into the room after it has heated the oven.

My invention consists in a hot air warming oven adapted to be mounted upon a hot air pipe of a hot air furnace and adapted to be placed in the wall of the room when it is installed, the oven having double or hollow walls in which the hot air circulates.

My invention also consists in a double-walled hot air warming oven through which a small percentage of the air, by which the oven is heated, is permitted to pass through the oven itself to heat the contents thereof, the oven having hollow walls in which the hot air circulates.

My invention also consists in the several features of construction and in the arrangements and combinations of parts by which I am enabled to attain the above mentioned and other objects and all as hereinafter described and particularly pointed out in the appended claim.

My invention will be more readily understood by reference to the accompanying drawings forming part of this specification in which:—

Figure —1— is a front elevation of a warming oven constructed in accordance with my invention and shown in conjunction with a hot air heating pipe, a portion of the wall being broken away to best illustrate the invention;

Fig. —2— is a vertical central section on the line 2—2 of Fig. —1—;

Fig. —3— is a horizontal section on the line 3—3 of Fig. —2—; and

Fig. —4— is a view similar to Fig. —3— illustrating a slight modification of my invention.

In said drawings, A represents a hot air pipe or conduit which usually rises through the wall B and is adapted to deliver hot air into a room, in the instance illustrated, through the wall register C located near the floor of the room in the usual manner. Usually the hot air pipe terminates at the top of the register though it could be extended upward through the wall to a room above.

I provide the hot air pipe A with an upward extension or nozzle D preferably within the wall B and I provide a warming oven E of peculiar construction with a downwardly extending nozzle F adapted to telescope upon the nozzle D and whereby hot air can be delivered from the pipe B to the oven E.

My improved oven is preferably rectangular in shape, being taller than it is broad and is adapted to be placed in the wall above the hot air pipe A and, as has been explained, receive hot air therefrom. Instead of permitting the hot air to come directly into contact with the contents of the oven, I prefer to make the oven with hollow walls G on all of its sides except the front, through which the hot air is free to circulate and thereby heat the oven and its contents. I preferably make the oven deeper from front to back than the depth of the wall where it is placed so that the forward portion H of the oven projects from the wall as clearly shown in Figs. —2— and —3—. I do this for two reasons, one to give a larger capacity to the oven and the other to permit me to place register grated openings J in the sides of the projecting portion H through which the hot air can escape into the room, thus causing a free and rapid circulation of the hot air through the walls of the oven and permitting the escape of the hot air into the room for the heating thereof. By means of this construction, I am enabled, in some situations, to dispense with the register C entirely. I prefer to provide the register C with a controlling device K made in the usual manner of a series of movable slats L and I also provide the grated openings J with similar controlling devices M. By means of these controlling devices, I am enabled to govern the degree of heat which I wish in the oven and also to govern independently the flow of hot air into the room from the hot air pipe A. I sometimes provide the upper end of the oven with a nozzle N adapted to receive the lower end of a conduit O by which hot air may be directed to a room above after it has served its purpose of heating the oven, the nozzle N communicating with the hollow walls of the oven. Preferably I divide the oven vertically by means of a shelf P which is a flat metallic plate removably supported on ledges Q secured to the side walls of the oven.

I prefer to build the oven itself in two parts, one part R consisting of the hollow top, bottom, back and side walls with the two nozzles, and adapted to be placed in position in the wall of the building while the building is being constructed, and the front portion H thereof being adapted to project outwardly beyond the face S of the wall B as shown in Figs. —2— and —3—. The other part T of the oven constitutes the front and comprises a telescoping rectangular frame U adapted to be received upon the projecting part of the main part R and provided with a door frame or cover V having an ornamental appearance as shown in Fig. —1—. The frame V is provided with rearwardly inclined flanges W adapted to project rearwardly and contact with the face S of the wall B, being provided with a marginal flange $W^1$ adapted to lie flat against the face of the wall when the part T is in position. The grated openings J are formed in the sides of this cover part, the outer shell of the double walls of the oven being cut away at these points to allow the hot air to escape from the walls of the oven through said grated openings J.

The frame V also constitutes a frame for a door X by which I close the oven. The door X is mounted upon the frame V by hinges Y and is provided with a latch Z by which it can be held closed. The door is as large as the oven so that when it is open, articles of maximum size can be placed in and withdrawn from the oven.

In installing my warming oven, the main part R with its double or hollow walls is installed or placed in the wall at the time the wall is constructed and at the time the hot air pipes are installed. Then after the walls are finished, the cover or front part T is placed in position telescoped upon the projecting portion of the part R and secured against easy or inadvertent removal by bolts or screws $T^1$ at top and bottom, suitable registering holes being provided for the bolts.

Under some circumstances, I desire to permit a small percentage of the hot air to pass through the oven itself, and for this purpose I provide a number of small openings $E^1$ in the bottom of the inner shell of the oven through which the hot air can escape into the lower part of the oven. I prefer that these openings shall be arranged at the rear part of the floor of the oven and I arrange them in a transverse row as shown. In order to permit a continuous escape of the hot air through said openings $E^1$ when the door X is closed, I provide a draft opening $X^1$ in the upper part of the door and I provide an adjustable damper $X^2$ for said opening $X^1$, by means of which I can regulate the flow of hot air through the oven, at times closing the opening $X^1$ and thus stopping the flow entirely, and at other times permitting more or less air to escape from the oven and thus more or less to enter through said openings $E^1$.

In Fig. —4—, I have illustrated a modified form of oven. In this case, I have omitted the grated openings J, making this part of the cover V solid and depending upon the natural circulation of the hot air through the hollow walls of the oven for the heating thereof.

While my improved oven might be arranged for use in other situations and in conjunction with more than one hot air pipe, I have chosen to illustrate my invention as connected to a single hot air pipe rising through the wall.

It will now be clear that I have provided a very simple warming oven for use in conjunction with the usual hot air pipes of a heating system; that it is neat in appearance, that it can be made to serve the purpose of a warming oven and a hot air register and that it is simple in construction, easy to install and very desirable and efficient.

I claim as my invention:—

In a device of the kind described, a hollow walled compartment open at its front adapted to be mounted in a wall and adapted to be connected at its lower end to a hot air pipe by which hot air can flow into the said hollow walls, said compartment projecting outward beyond the face of the wall, a door frame adapted for telescopic engagement with the projecting part of said compartment, a door carried thereby for closing the front of said compartment; openings at the sides of said frame for permitting outflow of hot air and communication between the space beneath said openings and the hollow walls of said compartment to which hot air can flow from said hollow walls out through said openings.

In testimony whereof I have signed my name in presence of two subscribing witnesses.

ALBERT CARO.

Witnesses:
M. M. BOYLE,
G. M. NEVILLE.

Copies of this patent may be obtained for five cents each, by addressing the "Commissioner of Patents, Washington, D. C."